(12) United States Patent
Sprenger

(10) Patent No.: US 12,728,768 B2
(45) Date of Patent: Sep. 8, 2026

(54) DEVICE FOR FASTENING A LONGITUDINAL ADJUSTER FOR A VEHICLE SEAT TO A VEHICLE STRUCTURE, AND VEHICLE

(71) Applicant: Adient US LLC, Plymouth, MI (US)

(72) Inventor: Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 248 days.

(21) Appl. No.: 18/576,766

(22) PCT Filed: Jul. 5, 2022

(86) PCT No.: PCT/IB2022/056198
§ 371 (c)(1),
(2) Date: Jan. 5, 2024

(87) PCT Pub. No.: WO2023/281389
PCT Pub. Date: Jan. 12, 2023

(65) Prior Publication Data

US 2024/0286529 A1 Aug. 29, 2024

(30) Foreign Application Priority Data

Jul. 6, 2021 (DE) ..................... 10 2021 117 467.8
Sep. 1, 2021 (DE) ..................... 10 2021 122 640.6

(51) Int. Cl.
*B60N 2/07* (2006.01)
*B60N 2/005* (2006.01)
(Continued)

(52) U.S. Cl.
CPC ............. *B60N 2/005* (2013.01); *B60N 2/067* (2013.01); *B60N 2/0715* (2013.01)

(58) Field of Classification Search
CPC .......... B60N 2/0715; B60N 2/07; B60N 2/04; B60N 2/00
(Continued)

(56) References Cited

U.S. PATENT DOCUMENTS 5,848,775 A * 12/1998 Isomura ............... B60N 2/0732 248/429
5,961,088 A * 10/1999 Chabanne ............ B60N 2/0818 248/429
(Continued)

FOREIGN PATENT DOCUMENTS

CN 102198811 A 9/2011
CN 103253159 A 8/2013
(Continued)

OTHER PUBLICATIONS

European Patent Office, International Search Report and Written Opinion in Application No. PCT/IB2022/056198, dated Oct. 12, 2022, 13 pages, Rijswijk, Netherlands.
(Continued)

*Primary Examiner* — Shin H Kim
(74) *Attorney, Agent, or Firm* — Marshall & Melhorn, LLC

(57) ABSTRACT

A device for fastening a longitudinal adjuster for a vehicle seat to a vehicle structure has a first rail, a floor attachment element and a connecting element. The first rail may have a first screw point in a front end region and a second screw point in a rear end region. The floor attachment element can be connected to the vehicle structure, and the connecting element is provided on a lower face of the first rail. The connecting element engages around or comes into abutment with the floor attachment element when the first rail is displaced in a longitudinal direction so that the first rail is prevented from lifting off in the vertical direction. A vehicle
(Continued)

having a device of this type for fastening the longitudinal adjuster to the vehicle structure of the vehicle is provided.

14 Claims, 7 Drawing Sheets

(51) Int. Cl.
*B60N 2/06* (2006.01)
*B60N 2/08* (2006.01)

(58) Field of Classification Search
USPC .................................................. 248/429, 430
See application file for complete search history.

(56) References Cited

U.S. PATENT DOCUMENTS

| | | | | |
|---|---|---|---|---|
| 6,299,121 | B1 | 10/2001 | Brault | |
| 9,579,993 | B2 * | 2/2017 | Watanabe | B60N 2/075 |
| 10,011,195 | B2 * | 7/2018 | Kume | B60N 2/08 |
| 10,351,021 | B2 * | 7/2019 | Nagatani | B60N 2/0025 |
| 11,479,150 | B2 * | 10/2022 | Sprenger | B60N 2/02258 |
| 12,179,638 | B2 * | 12/2024 | Kim | B60N 2/0722 |
| 2011/0101194 | A1 * | 5/2011 | Wetzig | B60N 2/0727 248/429 |
| 2013/0214551 | A1 | 8/2013 | Maruyama | |
| 2018/0043797 | A1 * | 2/2018 | Hoffmann | B60N 2/0705 |
| 2019/0061564 | A1 * | 2/2019 | Ito | B60N 2/0715 |
| 2024/0286529 | A1 * | 8/2024 | Sprenger | B60N 2/005 |

FOREIGN PATENT DOCUMENTS

| | | | |
|---|---|---|---|
| CN | 105416103 | A | 3/2016 |
| CN | 112983949 | A | 6/2021 |
| DE | 1755740 | A1 | 1/1972 |
| DE | 19628382 | C2 | 1/2000 |
| DE | 20308015 | U1 | 9/2003 |
| DE | 102018126482 | A1 | 4/2020 |
| DE | 102020108378 | A1 | 7/2021 |
| EP | 0143678 | A1 | 6/1985 |
| FR | 2789456 | A1 | 8/2000 |
| JP | 2004322678 | A | 11/2004 |

OTHER PUBLICATIONS

German Patent and Trademark Office, Search Report in Application No. DE 10 2021 122 640.6, dated Mar. 25, 2022, 6 pages.

* cited by examiner z
x
10
16
18
20
22
24
26
26
30
30
30a
30b
34
34
12, 12a
14
40
40
50
50
50
50
52
52
52
52
54
54
F 10
12, 12a
14
16
18
20
22
24
26
30
30a
30b
34
38
40
50
52
54
F
z
x 12
230
230
230

230b
230
230a
230b
230
230a

DEVICE FOR FASTENING A LONGITUDINAL ADJUSTER FOR A VEHICLE SEAT TO A VEHICLE STRUCTURE, AND VEHICLE

FIELD

The invention relates to a device for fastening a longitudinal adjuster, in particular for a vehicle seat, to a vehicle structure, the device comprising at least one first rail of the longitudinal adjuster, at least one floor attachment element and at least one connecting element, the first rail having a first screw point in a front end region of the first rail and a second screw point in a rear end region of the first rail. The invention further relates to a vehicle.

BACKGROUND

It is known from the mass production of motor vehicles to hold a vehicle seat on the bodywork of the motor vehicle by means of at least one seat rail. By means of the seat rail, the vehicle seat is lockable in a plurality of different longitudinal positions on the seat rail in the vehicle longitudinal direction.

Devices are known for fastening longitudinal adjusters, in particular in vans, wherein a vehicle seat can be released from the seat rail and can be removed from a passenger compartment in order to increase, for example, the storage space. Alternatively, it is known to transfer the vehicle seat into a stowed position, in particular into a so-called easy entry position, whereby the rear storage space can also be increased.

A spindle drive for an adjusting device for a longitudinal adjustment of a motor vehicle seat is disclosed in DE 17 55 740 A1. The motor vehicle seat is fastened to two parallel sliding rails which run on guide rails arranged on the vehicle floor. In each case, a threaded spindle is arranged parallel to each sliding rail and is connected fixedly in terms of rotation thereto. A gear block which receives a spindle nut which is arranged on the threaded spindle and a drive worm meshing therewith is mounted adjacent to the fixed guide rails and is connected fixedly thereto. The drive worms of each gear block are connected to a common drive motor. The gear block consists of two parts which are screwed together. If the drive motor is actuated, the spindle nuts are rotated via the drive worms. Since the threaded spindle is arranged fixedly in terms of rotation, the threaded spindle and the vehicle seat connected thereto are thereby displaced relative to the gear block and thus relative to the vehicle floor.

A seat structure for a vehicle is disclosed in US 2013/0214551 A1, comprising a plurality of fastening elements, which are spaced apart from one another from front to back in a longitudinal direction of the vehicle and fastened to a vehicle floor, and a sliding rail. The sliding rail comprises a stationary aluminum rail which is held by the fastening elements and a movable rail which is movable relative to the stationary rail in a forward and a rearward direction. The seat structure also has an iron reinforcing plate which is fastened to the stationary rail at a position within a seat belt usage range by the fastening elements.

A general design of keyhole is disclosed in DE 203 08 015 U1.

A longitudinal adjuster with a guide rail which is oriented approximately symmetrically relative to a central plane on a floor pan of a motor vehicle having a plurality of slots is disclosed in FR 2 789 456 A1. During the mounting, the lower part of the guide rail is displaced in the slots, wherein the guide rail is fixed transversely and vertically by means of a longitudinal bayonet fixing.

The object of the invention is to improve a device for fastening a longitudinal adjuster of the type mentioned in the introduction, in particular to provide a device for fastening a longitudinal adjuster, by which a longitudinal adjuster which is premounted on a vehicle seat can be securely mounted with little effort in a vehicle and/or can be dismantled if required. The object of the invention is also to provide a corresponding vehicle.

Summary

This object is achieved according to the invention by a device for fastening a longitudinal adjuster, in particular for a vehicle seat, to a vehicle structure, the device comprising at least one first rail of the longitudinal adjuster, at least one floor attachment element and at least one connecting element, the first rail having a first screw point in a front end region of the first rail and a second screw point in a rear end region of the first rail, wherein the at least one floor attachment element is connectable to the vehicle structure, and the at least one connecting element is provided on a lower face of the first rail, wherein the at least one connecting element is positioned between the first screw point and the second screw point, and wherein the floor attachment element is designed as a step pin or shoulder pin, wherein the at least one connecting element engages around and/or is in abutment with the at least one floor attachment element when the first rail is displaced in a longitudinal direction, in such a way that the first rail is prevented from lifting off in the vertical direction.

A fastening of the longitudinal adjuster, optionally with the vehicle seat mounted thereon, can take place in a simple manner since the at least one floor attachment element is connectable to the vehicle structure and the at least one connecting element is connected to a lower face of the first rail, wherein the at least one connecting element is positioned between the first screw point and the second screw point, and the at least one connecting element engages around the at least one floor attachment element when the first rail is displaced in a longitudinal direction, in such a way that the first rail is prevented from lifting off in the vertical direction. A secure fastening, in particular in the central region, can be ensured by the solution according to the invention, particularly in the case of a relatively long first rail (compared with a displaceable second rail), in the premounted state the central region thereof in the longitudinal direction not being accessible for a conventional screw connection to the vehicle floor, which is known from the prior art.

Advantageous embodiments, which can be used individually or in combination with one another, form the subject matter of the dependent claims.

The longitudinal adjuster can have at least one second rail which is displaceably arranged relative to the first rail. The longitudinal adjuster can have a spindle drive which is arranged between the first rail and the second rail for displacing the second rail relative to the first rail. The first rail can have a base portion. The first rail can have two limbs protruding on opposing sides of the base portion. The first rail can have a substantially U-shaped cross section.

The spindle drive can have a spindle. The spindle can have an external thread. The spindle drive can have a gear which is drivable by means of a motor. The gear can be held in the second rail.

According to a first embodiment of the spindle drive, the spindle can be fixedly held in the first rail by means of two spindle holders. According to the first embodiment of the spindle drive, the spindle can be held fixedly in terms of rotation. According to the first embodiment of the spindle drive, the gear can have a spindle nut which has an internal thread and which is operatively connected to the external thread of the spindle. According to the first embodiment of the spindle drive, the gear can be displaceable along the spindle by being driven by the motor.

According to a second embodiment of the spindle drive, the spindle can be connected fixedly in terms of rotation to the gear at an end portion of the spindle. According to the second embodiment of the spindle drive, the spindle drive can have a spindle block which is fixed in the first rail and which has an internal thread, the spindle block being operatively connected to the external thread of the spindle. According to the second embodiment of the spindle drive, the spindle can be rotatably screwed into the spindle block.

According to the second embodiment of the spindle drive, the spindle block can be movable along the driven spindle.

At least one floor attachment element can be arranged on, in particular fastened to, a vehicle floor. The first rail can have at least one connecting element. The at least one connecting element can be fastened to a base of the first rail, in particular a lower face of the base of the first rail.

The connecting element can have a holding portion, the connecting element being connected thereby to the first rail. The connecting element can have a fork portion. The fork portion can have a fork-shaped recess. The fork portion can cooperate with the floor attachment element. The at least one connecting element is preferably arranged in the region of the spindle of the longitudinal adjuster. The holding portion can have a rubber element. The rubber element can be premounted on the holding portion. The rubber element can be arrangeable between the holding portion and a floor attachment element on the first rail.

The device can have a plurality of floor attachment elements. The at least one floor attachment element can be premounted on the vehicle structure. The floor attachment element can be a shoulder pin. The floor attachment element is preferably arranged below the spindle of the longitudinal adjuster, when viewed in a transverse direction.

The device can have at least one connecting adapter. The at least one connecting adapter can be arranged in the region of the first fastening point or the second fastening point. The device can have two connecting adapters. The connecting adapters can be arranged in each case on a fastening point furthest to the front and on a fastening point furthest to the rear in a longitudinal extent of the first rail. The first fastening point can be a screw point which is furthest to the front in the longitudinal direction. The second fastening point can be a screw point which is furthest to the rear in the longitudinal direction. The at least one connecting adapter can be a spacer profile. The at least one connecting adapter can serve for height compensation. The at least one connecting adapter can have a through-opening.

The device can have at least one fixing element. The device can have two fixing elements. The fixing element can be a screw or a threaded pin. The fixing element can be screwable through an opening of the first rail and through a through-opening of the connecting adapter into a threaded portion which is connected to the vehicle structure.

The mounted device can be secured by means of the fixing element against a movement parallel to the vehicle structure and perpendicular to the vehicle structure.

The underlying object is also achieved according to the invention by a vehicle having a device according to the above description for fastening a longitudinal adjuster to a vehicle structure of the vehicle. The vehicle can have a vehicle seat, in particular a motor vehicle seat.

The vehicle seat can have a seat part. The vehicle seat can have a backrest. The backrest can be adjustable in terms of its inclination relative to the seat part. The vehicle seat can have a longitudinal adjuster. The seat part can be connected to the longitudinal adjuster. The seat part can be connected to the second rail of the longitudinal adjuster. The seat part can be screwed to the second rail of the longitudinal adjuster.

In summary, and expressed in other words, according to the invention it can be provided that floor attachment elements or adapter parts, for example in the form of a shoulder pin or step pin, are provided at fastening points in a region below a spindle in a first rail. These floor attachment elements are preferably fastened, in particular screwed on, before the first rail is mounted in the vehicle. Connecting elements with a fork-shaped recess or so-called keyholes are attached to a lower face of the first rail. When the longitudinal adjuster is mounted in the vehicle, the rails are initially positioned slightly offset in the vehicle in order to pass through the opening of the fork-shaped recesses or the keyholes. Then the rails are displaced in the longitudinal direction in order to bring the connection between the connecting elements and a cooperating floor attachment element into engagement. Finally, fixing elements are screwed as direct screw connections to the front and rear of the spindle in order to connect the vehicle seat finally to the vehicle.

In order to avoid rattling noises, a rubber buffer can be attached between the floor attachment elements (adapter parts/step pin) and the connecting elements (adapters with keyholes) on the first rail.

Before embodiments of the invention are described hereinafter by way of the drawings, it has to be mentioned first that the invention is not limited to the described components or the described method steps. Moreover, the terminology used does not constitute a limitation but is merely exemplary. If the singular is used hereinafter in the description and the claims, the plural is encompassed therewith in each case, provided that this is not explicitly excluded by the context.

DESCRIPTION OF THE FIGURES

The invention is explained hereinafter in more detail with reference to two advantageous exemplary embodiments shown in the figures. The invention is not limited to these exemplary embodiments, however. In the figures.

DETAILED DESCRIPTION

Figure 1:
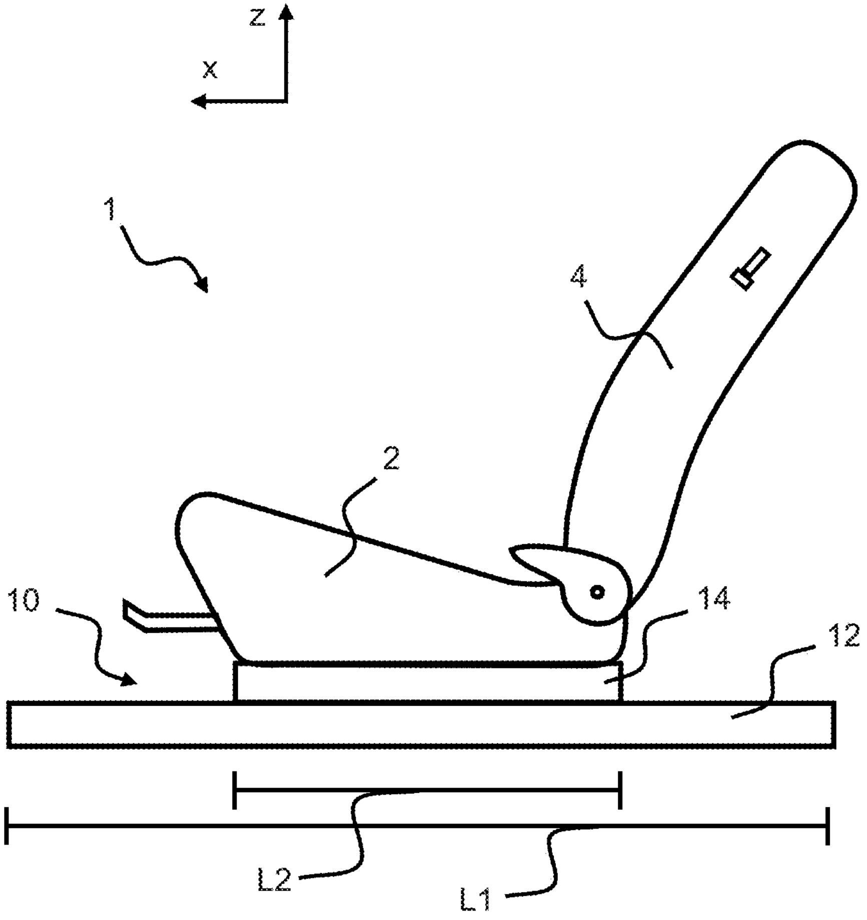
FIG. 1: shows a schematic view of a vehicle seat with a device according to the invention.

A vehicle seat 1 shown schematically in FIG. 1 is described hereinafter by using three spatial directions running perpendicularly to one another. With a vehicle seat 1 installed in the vehicle, a longitudinal direction x runs substantially horizontally and preferably parallel to a vehicle longitudinal direction which corresponds to the usual direction of travel of the vehicle. A transverse direction running perpendicularly to the longitudinal direction x in the vehicle is also oriented horizontally and runs parallel to a vehicle transverse direction. A vertical direction z runs perpendicularly to the longitudinal direction x and perpendicularly to the transverse direction. With a vehicle seat 1 installed in the vehicle, the vertical direction z runs parallel to the vehicle vertical axis.

The positional and directional information used, such as for example front, rear, top and bottom, refer to a viewing direction of an occupant seated in the vehicle seat 1 in the normal sitting position, wherein the vehicle seat 1 is installed in the vehicle, oriented in a suitable position of use for passenger conveyance with an upright backrest 4 and in the usual direction of travel. The vehicle seat 1 according to the invention, however, can also be fitted in a different orientation, for example transversely to the direction of travel.

The vehicle seat 1, in particular the motor vehicle seat, has a seat part 2 and the backrest 4. The backrest 4 is adjustable in terms of its inclination relative to the seat part 2. The vehicle seat 1 has a longitudinal adjuster 10 for adjusting a seat longitudinal position. The longitudinal adjuster 10 has at least one first rail 12 with a first screw point 16 in a front end region and a second screw point 18 in a rear end region. In the present case, the longitudinal adjuster 10 also has at least one second rail 14 which is displaceably arranged relative to the first rail 12. The seat part 2 in the present case is connected, in particular screwed, to the second rail 14 of the longitudinal adjuster 10. A seat height adjustment device, not shown, can be arranged between the seat part 2 and the second rail 14 of the longitudinal adjuster 10.

The longitudinal adjuster 10 has in the present case a second rail 14 with a length L2, wherein a length L1 of the first rail 12 is greater than the length L2 of the second rail 14, in particular the length L1 of the first rail 12 corresponds to a multiple of the length L2 of the second rail 14. The present longitudinal adjuster 10 is a longitudinal adjuster 10 with an extended adjustment path compared with a conventional device for seat longitudinal adjustment.

The first rail 12 and the second rail 14 of the longitudinal adjuster 10 can form a first rail pair. The longitudinal adjuster 10 can have a second rail pair, which is not shown for illustrative reasons and which is preferably arranged symmetrically to the first rail pair.

Figure 2:
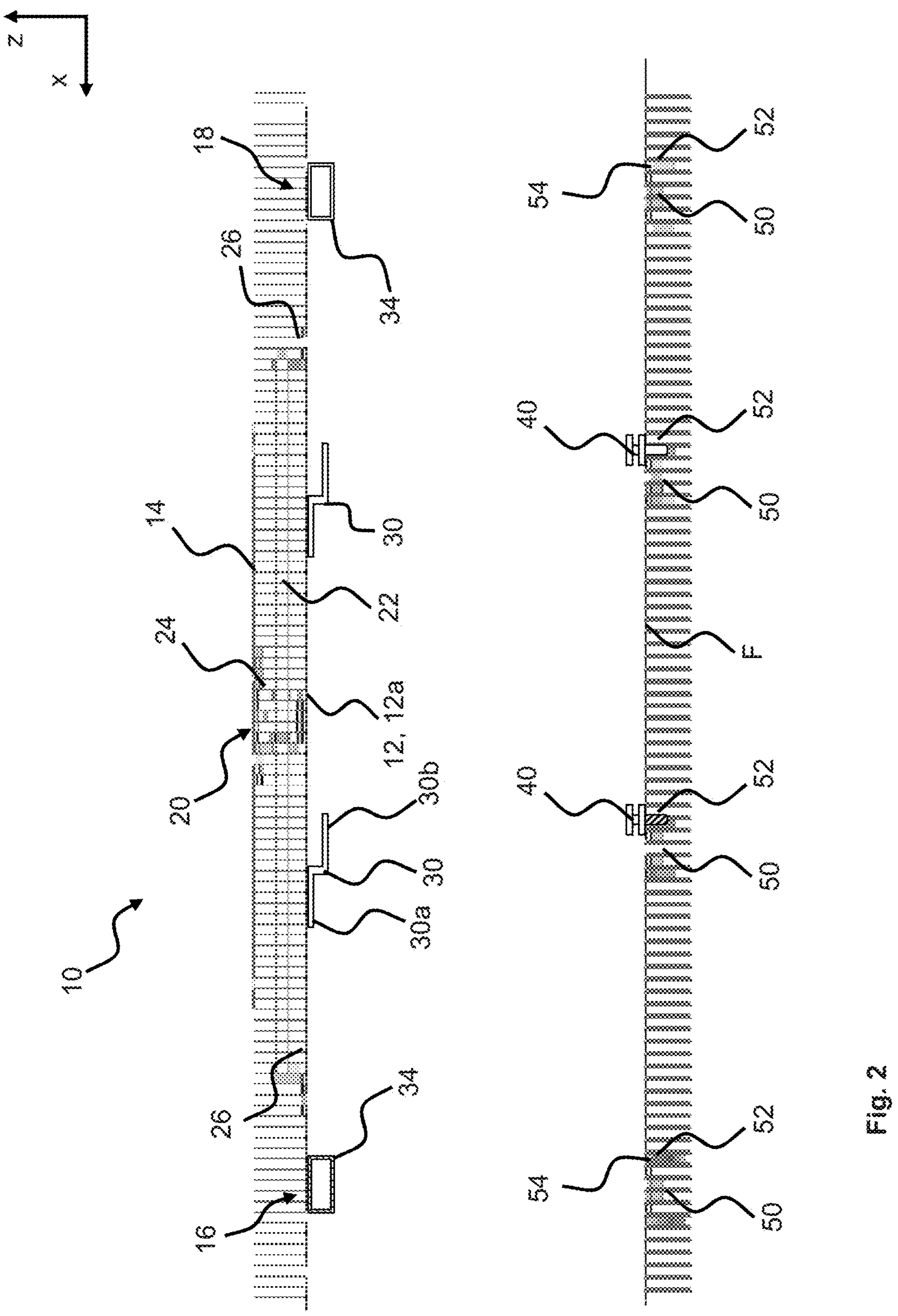
FIG. 2: shows a longitudinal section of the device according to the invention according to a first exemplary embodiment before mounting on a vehicle structure.
Figures 3, 4:
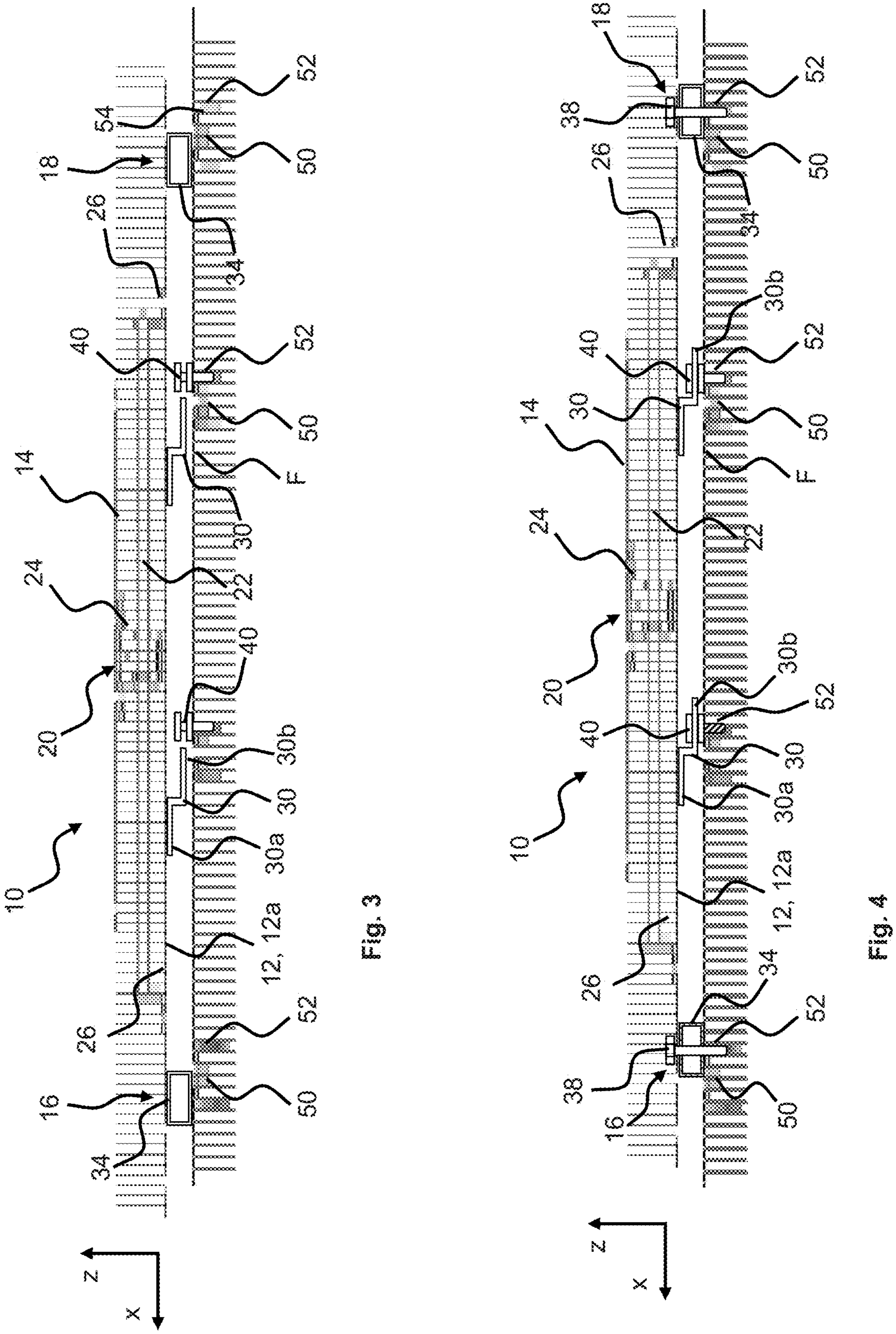
FIG. 3: shows a longitudinal section of the device according to the first exemplary embodiment of FIG. 2 during mounting on the vehicle structure.
FIG. 4: shows a longitudinal section of the device according to the first exemplary embodiment of FIG. 2 after mounting on the vehicle structure.

FIGS. 2 to 4 show a longitudinal section of the device according to the invention in various states, before during and after mounting on a vehicle structure F.

The device serves for fastening the longitudinal adjuster 10 for the vehicle seat 1 to a vehicle structure F.

The longitudinal adjuster 10 has at least one first rail 12, at least one second rail 14 which is displaceably arranged relative to the first rail 12, and a spindle drive 20 which is mounted between the first rail 12 and the second rail 14 for displacing the second rail 14 relative to the first rail 12.

The spindle drive 20 has a spindle 22 with an external thread. The spindle drive 20 has a gear 24 which is drivable by means of a motor. The gear 24 is connected fixedly to the second rail 14, in particular by means of a gear holder.

In the present case, the spindle drive 20 has a spindle 22 which is fixedly held in the first rail 12 by means of two spindle holders 26. The spindle 22 is preferably held fixedly in terms of rotation in the spindle holders 26. The spindle holders 26 in each case connect one end of the spindle 22 to a base 12*a* of the first rail 12. The gear 24 has a spindle nut which has an internal thread and which is operatively connected to the external thread of the spindle 22. The gear 24 is displaceable along the spindle 22 by being driven by the motor.

The first rail 12 has at least one connecting element 30, in the present case two connecting elements 30. The connecting elements 30 each have a holding portion 30*a*, the connecting element 30 being held thereby on the first rail 12. The connecting elements 30 are fastened, preferably welded, to a lower face of the base 12*a* of the first rail 12. Alternatively, however, the connecting elements 30 can also be screwed, riveted or otherwise fastened. The connecting element 30 has a connecting portion 30*b* at an end remote from the holding portion 30*a*. The connecting portion 30*b* comprises a fork-shaped recess. The connecting element 30 can also be configured integrally with the lower face of the rail 12. For example, the connecting element 30 can be injection-molded or integrally formed on the lower face.

In the present case, the vehicle structure F is represented by way of example by a plurality of carrier elements 50 arranged below a vehicle floor. The carrier elements 50 can be U-shaped carrier profiles, for example, running in a vehicle transverse direction. The carrier elements 50 provide in each case a threaded carrier 52, for example a weld nut or the like, for the first fastening point 16 and the second fastening point 18.

At least one floor attachment element 40 is arranged on the vehicle structure F, in particular a vehicle floor. In the present case, two floor attachment elements 40 are arranged. The floor attachment elements 40 can be provided in the desired number depending on the length L1 of the first rail 12. The vehicle structure F has mounting openings 54 for screwing in the floor attachment elements 40. The two floor attachment elements 40 are premounted on the vehicle structure F. The floor attachment elements 40 are designed as shoulder pins or step pins.

The floor attachment elements 40 comprise in each case a base body 42 and at least two flange portions 44, 46 which are axially spaced apart from one another and which are connected to the base body 42. An upper flange portion 44 can be configured as a mushroom head or pin head. A lower flange portion 46 can be configured as a shoulder or step.

Both flange portions 44, 46 protrude radially from the base body 42. When the first rail 12 is displaced in a longitudinal direction x the connecting elements 30 engage around the associated floor attachment elements 40, in particular the base body 42, between the two flange portions 44, 46. As the respective fork-shaped recess of the connecting elements 30 engages around the base body 42 between the flange portions 44, 46, the rail 12 is also secured against inadvertent displacement in the vertical direction z during, and also after, mounting. The device can accordingly have a so-called mushroom head lock.

The device also has at least one connecting adapter 34, in the present case two connecting adapters 34. The connecting adapters 34 are designed as spacer profiles and are each arranged on a first fastening point 16 furthest to the front and second fastening point 18 furthest to the rear in the longitudinal extent of the first rail 12, in particular parallel to the longitudinal direction x. By means of the connecting adapters 34 it is possible to compensate for a height difference which is necessary for the connection between the connecting elements 30 and the floor attachment elements 40.

The device has two fixing elements 38 which can be designed in the form of a screw or a threaded pin. The fixing element 38 is screwable through an opening of the first rail 12 and through a through-opening of the connecting adapter 34 into a threaded carrier 52 which is connected to the vehicle structure F.

The connecting portion 30*b* cooperates with the floor attachment element 40. The connecting element 30 is preferably arranged in the region of the spindle 22 of the premounted longitudinal adjuster 10.

The at least one connecting element 30 can engage around the at least one floor attachment element 40, in particular when the first rail 12 is displaced relative to the vehicle structure F parallel to the longitudinal direction x, in such a way that the first rail 12 is prevented from being lifted off in the vertical direction z. The floor attachment element 40 is preferably arranged in the region of the spindle 22 of the premounted longitudinal adjuster 10.

By positioning the connecting elements 30 in the region of the spindle 22 of the premounted longitudinal adjuster 10 and the corresponding orientation of the floor attachment elements 40, a possibility can be provided in a particularly advantageous manner for connecting the first rail 12 in a central portion which is no longer accessible for mounting the first rail 12 on the vehicle structure F due to the spindle 22 which is fastened in the first rail 12, in particular with a premounted longitudinal adjuster 10. Wherein, if necessary, the device for fastening the longitudinal adjuster 10 for the vehicle seat 1 to the vehicle structure F can also be dismantled again if the vehicle seats 1 of a rear seat row are temporarily not required.

For fastening the longitudinal adjuster 10 for the vehicle seat 1 to the vehicle structure F, it is provided that the premounted longitudinal adjuster 10 is positioned from above onto the vehicle structure F. Then the longitudinal adjuster 10 is displaced parallel to the longitudinal direction x, with the connecting elements 30 oriented relative to the floor attachment elements 40, such that the connecting portions 30*b* of the connecting elements 30 come into engagement with the floor attachment elements 40. Finally the two fixing elements 38 are screwed through one respective opening of the first rail 12 and through the respective through-opening of the connecting adapter 34 into the respective threaded carrier 52 which is connected to the vehicle structure F. By screwing in the fixing elements 38, the longitudinal adjuster 10 is secured against a movement parallel to the vehicle structure F (in the longitudinal direction x and/or in the transverse direction y) and perpendicular to the vehicle structure F (in the vertical direction z) and from release from the vehicle structure F.

Figure 5:
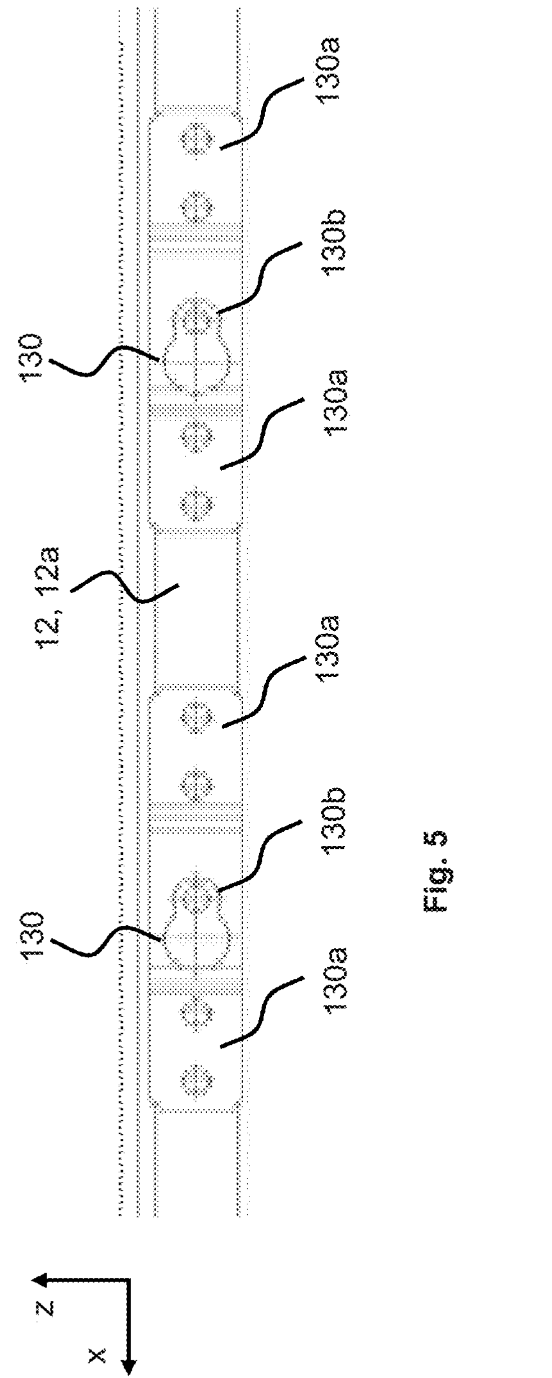
FIG. 5: shows in a detail a longitudinal section of the device according to a second exemplary embodiment in the region of a connecting element.
Figure 6:
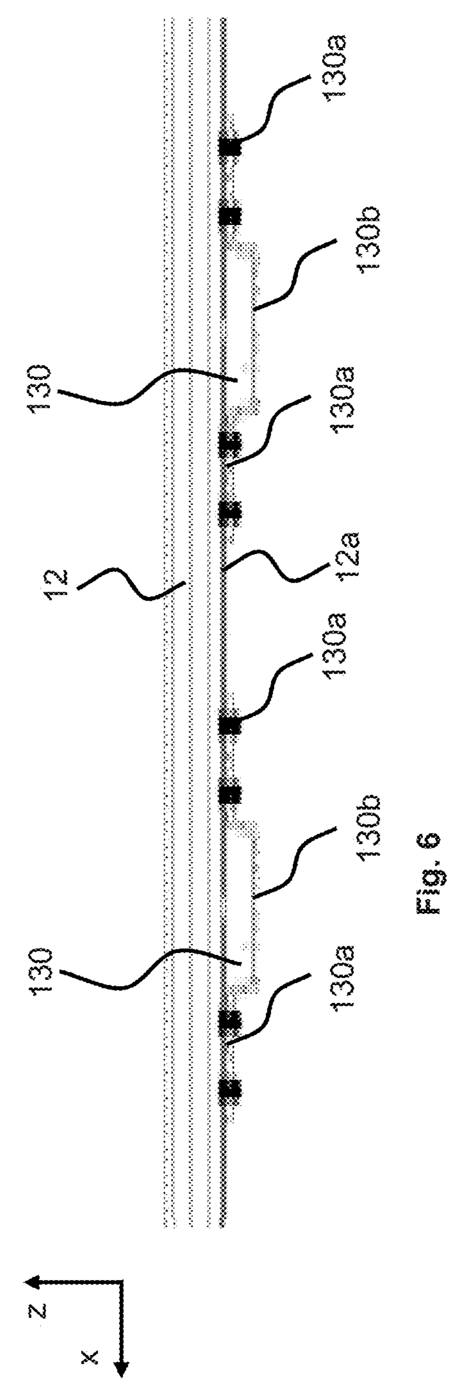
FIG. 6: shows in a detail a view from below of the device according to the second exemplary embodiment in the region of the connecting element.

FIGS. 5 and 6 show in a detail a device according to the invention according to a second exemplary embodiment in the region of a connecting element 130. Unless explicitly described differently hereinafter, the connecting element 130 corresponds to the connecting element 30 of the device described above according to the first exemplary embodiment.

In the present case, the connecting element 130 has substantially a U-shape with ends bent outwardly by 90°. The connecting element 130 has a connecting portion 130*b*. The connecting element 130 has in each case a holding portion 130*a* on both opposing ends of the connecting portion 130*b* in the longitudinal direction x. The connecting portion 130*b* has an opening, in particular an opening in the form of a keyhole.

Figures 7, 8:
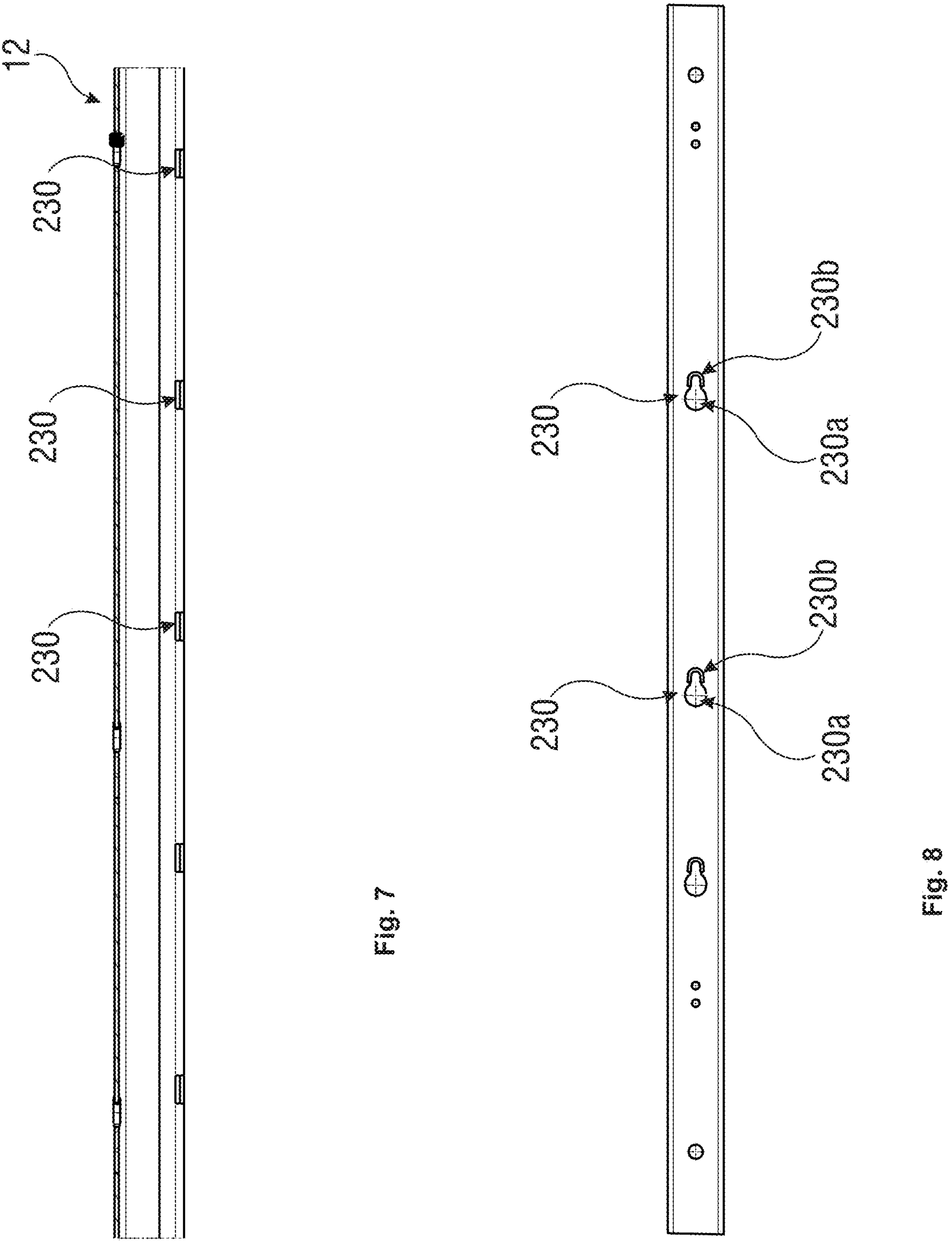
FIG. 7: shows a longitudinal section through a rail according to a third exemplary embodiment in the region of a connecting element.
FIG. 8: shows a view from below of the rail according to the third exemplary embodiment of FIG. 7 in the region of the connecting element.

FIG. 7 shows a longitudinal section through a rail 12 of a device according to a third exemplary embodiment in the region of a connecting element 230. In particular, FIG. 7 shows a plurality of connecting elements 230 which in the present exemplary embodiment are configured integrally with the lower face of the rail 12. The connecting elements 230 are incorporated in the lower face of the rail 12.

The connecting elements 230 comprise in each case a connecting opening 230*a* which is configured in the lower face of the first rail 12 for receiving and/or passing through an associated floor attachment element 40, which is shown in more detail in FIGS. 9 to 11 and corresponds to the floor attachment element 40 of the above-described device according to the first exemplary embodiment, unless explicitly described differently hereinafter. The connecting opening 230*a* is configured in the form of a so-called keyhole. The connecting opening 230*a* can alternatively have a fork-shaped recess.

The connecting elements 230 also comprise in each case a connecting stop 230*b* which cooperates with the floor attachment element 40. The connecting stop 230*b* is configured on an opening edge of the connecting opening 230*a* into which the respective floor attachment element 40 is clamped or latched. The connecting stop 230*b* can be configured as a buffer element, for example a rubber element. The connecting stop 230*b* can be incorporated as a coating in the connecting opening 230*a*. The buffer element or the coating can have damping and/or absorbing properties.

Figure 11:
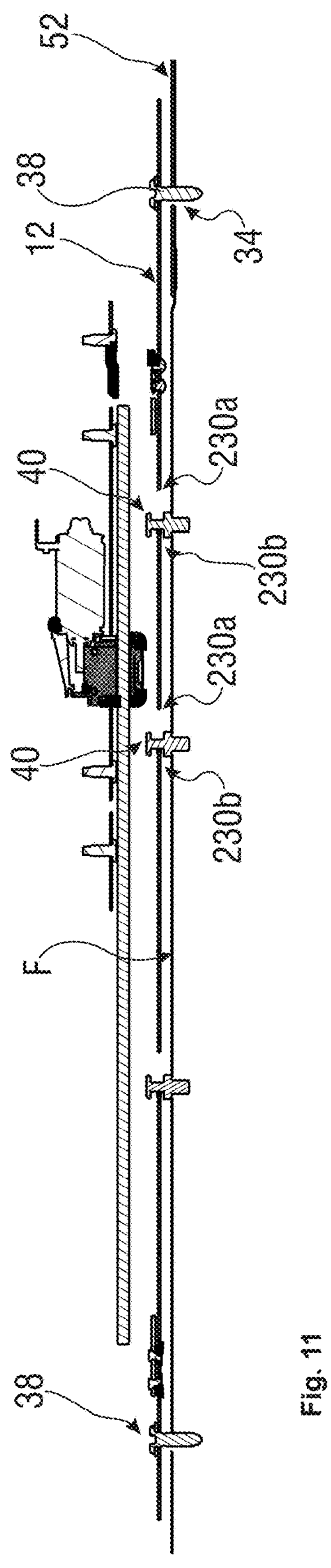
FIG. 11: shows a longitudinal section of the device according to the third exemplary embodiment of FIG. 7 after mounting on the vehicle structure.

The at least one connecting element 230 can receive the at least one floor attachment element 40, in particular when the first rail 12 is displaced relative to the vehicle structure F parallel to the longitudinal direction x, in such a way that the first rail 12 is prevented from lifting off in the vertical direction z and from a further displacement in the longitudinal direction x, as shown in FIG. 11. The floor attachment element 40 is preferably arranged in the region of the spindle 22 of the premounted longitudinal adjuster 10.

By positioning the connecting elements 230 in the region of the spindle 22 of the premounted longitudinal adjuster 10 and the corresponding orientation of the floor attachment elements 40, a possibility can be provided in a particularly advantageous manner for connecting the first rail 12 in a central portion which is no longer accessible for mounting the first rail 12 on the vehicle structure F due to the spindle 22 which is fastened in the first rail 12, in particular with a premounted longitudinal adjuster 10, wherein, if necessary, the device for fastening the longitudinal adjuster 10 for the vehicle seat 1 to the vehicle structure F can also be dismantled again if the vehicle seats 1 of a rear seat row are temporarily not required.

For fastening the longitudinal adjuster 10 for the vehicle seat 1 to the vehicle structure F, it is provided that the premounted longitudinal adjuster 10 is positioned from above onto the vehicle structure F. Then the longitudinal adjuster 10 is displaced parallel to the longitudinal direction x, with the connecting elements 230 which are oriented relative to the floor attachment elements 40, such that the connecting stops 230*b* of the connecting elements 230 come into abutment with the floor attachment elements 40.

FIG. 8 shows a view from below of the first rail 12 according to the third exemplary embodiment of FIG. 7 in the region of the connecting elements 230. The connecting stops 230*b* are configured, for example, to be substantially U-shaped or C-shaped.

Figure 9:
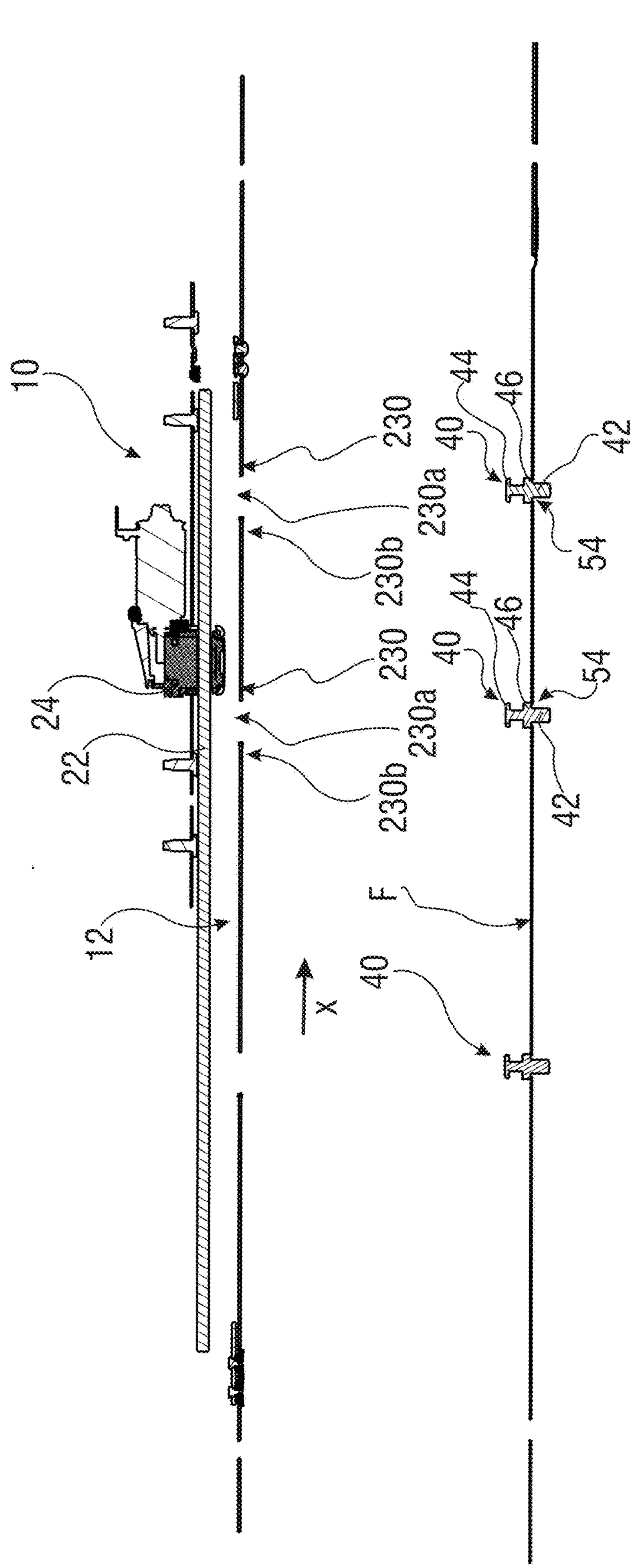
FIG. 9: shows a longitudinal section of a device according to the third exemplary embodiment of FIG. 7 before mounting on a vehicle structure.

FIG. 9 shows a longitudinal section of a device according to the third exemplary embodiment of FIG. 7 before mounting on a vehicle structure F.

At least one floor attachment element 40 is arranged on the vehicle structure F, in particular a vehicle floor. In the present case, a plurality of floor attachment elements 40 are arranged. The floor attachment elements 40 can be provided in the desired number depending on the length L1 of the first rail 12. The vehicle structure F has mounting openings 54 for screwing in the floor attachment elements 40. The floor attachment elements 40 are premounted on the vehicle structure F. The floor attachment elements 40 are designed as shoulder pins or step pins.

The device can be fastened relative to the first and second exemplary embodiment without the connecting adapters 34. As the connecting elements 230 are integrally incorporated in the lower face of the first rail 12, the use of adapters can be dispensed with. A further cost saving and optimization of the constructional space are implemented thereby.

The floor attachment elements 40 comprise in each case a base body 42 and at least two flange portions 44, 46 which are axially spaced apart from one another and which are connected to the base body 42. An upper flange portion 44 can be configured as a mushroom head or pin head. A lower flange portion 46 can be configured as a shoulder or step. Both flange portions 44, 46 protrude radially from the base body 42. The floor attachment elements 40 can be latched or positively clamped in the connecting elements 230.

Figure 10:
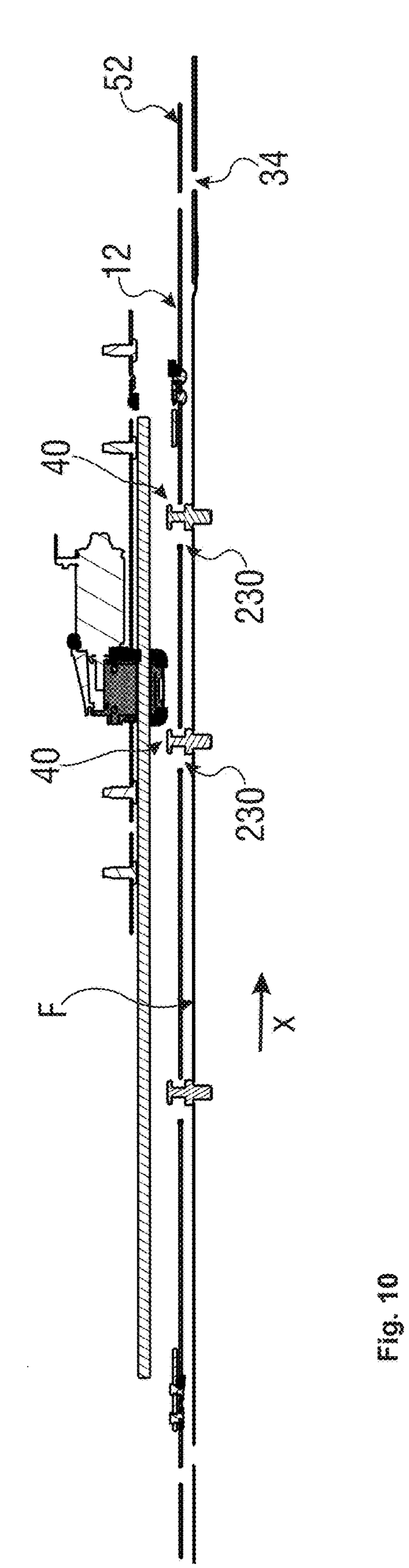
FIG. 10: shows a longitudinal section of the device according to the third exemplary embodiment of FIG. 7 during mounting on the vehicle structure.

FIG. 10 shows a longitudinal section of the device according to the third exemplary embodiment of FIG. 7 during mounting on the vehicle structure F. The connecting elements 230 receive the floor attachment elements 40 in the vertical direction z and, when the first rail 12 is displaced in a longitudinal direction x, the connecting elements 230 can come into abutment with the associated floor attachment elements 40, in particular on the respective base body 42 between the two flange portions 44, 46. As the respective fork-shaped recess of the connecting elements 230 or the connecting opening 230*a* engages around the base body 42 between the flange portions 44, 46 and the respective connecting stop 230*b* comes into abutment with the base body 42, the first rail 12 is secured against inadvertent displacement in the vertical direction z and in the longitudinal direction x during and also after mounting. The device can accordingly have a so-called mushroom head lock.

FIG. 11 shows a longitudinal section of the device according to the third exemplary embodiment of FIG. 7 after mounting on the vehicle structure F. Finally, two fixing elements 38 are screwed through one respective opening of the first rail 12 and through one respective through-opening provided in the vehicle structure F. By screwing the fixing elements 38, the longitudinal adjuster 10 is secured against movement parallel to the vehicle structure F (in the longitudinal direction x and/or in the transverse direction y) and perpendicular to the vehicle structure F (in the vertical direction z) and from release from the vehicle structure F. The device has two fixing elements 38 which can be designed in the form of a screw or a threaded pin. The fixing element 38 is screwable through an opening of the first rail 12 and through a through-opening formed in the vehicle structure F into a threaded carrier 52 which is connected to the vehicle structure F.

The features which are disclosed in the above description, the claims and the drawings can be of importance both individually and in combination for implementing the invention in its various embodiments, provided they are covered by the protected scope of the claims.

While the invention has been described in the drawings and the above description in detail, the descriptions are to be understood as illustrative and exemplary and not limiting. In particular, the choice of the proportions of the individual elements shown by way of illustration are not to be interpreted as necessary or limiting. Moreover, the invention is not limited, in particular, to the described exemplary embodiments. Further variants of the invention and the implementation thereof are found by a person skilled in the art from the above disclosure, the figures and the claims.

Terms used in the claims such as "comprise", "have", "contain", "include" and the like, do not exclude further elements or steps. The use of the indefinite article does not exclude a plurality thereof. An individual device can perform the functions of a plurality of units or devices mentioned in the claims.

LIST OF REFERENCE SIGNS

- 1 Vehicle seat
- 2 Seat part
- 4 Backrest
- 10 Longitudinal adjuster
- 12 First rail
- 12*a* Base
- 14 Second rail
- 16 First screw point
- 18 Second screw point
- 20 Spindle drive
- 22 Spindle
- 24 Gear
- 26 Spindle holder
- 30; 130; 230 Connecting element
- 30*a*; 130*a* Holding portion
- 30*b*; 130*b* Connecting portion
- 230*a* Connecting opening
- 230*b* Connecting stop
- 34 Connecting adapter
- 38 Fixing element
- 40 Floor attachment element
- 42 Base body
- 44; 46 Flange portion
- 50 Carrier element
- 52 Threaded carrier
- 54 Mounting opening
- L1 Length of first rail
- L2 Length of second rail
- F Vehicle structure
- x Longitudinal direction
- y Transverse direction z Vertical direction

The invention claimed is:

1. A device for fastening a longitudinal adjuster for a vehicle seat to a vehicle structure, comprising:

at least one first rail of the longitudinal adjuster, at least one floor attachment element, and at least one connecting element, the first rail having a first screw point in a front end region of the first rail and a second screw point in a rear end region of the first rail, wherein the at least one floor attachment element is connectable to the vehicle structure, and the at least one connecting element is provided on a lower face of the first rail, wherein the at least one connecting element is positioned between the first screw point and the second screw point and wherein the at least one floor attachment element is designed as a step pin or shoulder pin, wherein the at least one connecting element engages around or comes into abutment with the at least one floor attachment element when the first rail is displaced in a longitudinal direction, in such a way that the first rail is prevented from lifting off in the vertical direction, wherein the at least one connecting element has a holding portion, the connecting element being connected thereby to the first rail.

2. The device as claimed in claim 1, wherein the at least one connecting element has a connecting portion.

3. The device as claimed in claim 1, wherein the connecting portion cooperates with the floor attachment element.

4. The device as claimed in claim 1, wherein the at least one connecting element is configured integrally with the lower face of the first rail.

5. The device as claimed in claim 1, wherein the at least one connecting element comprises a connecting opening which is configured in the lower face of the first rail and into which the floor attachment element can be inserted at least in some portions.

6. The device as claimed in claim 1, wherein the at least one connecting element has a connecting stop which cooperates with the floor attachment element.

7. The device as claimed in claim 5, wherein the connecting stop is configured on an opening edge of the connecting opening.

8. The device as claimed in claim 1, wherein the at least one floor attachment element comprises a base body and at least two flange portions which are axially spaced apart from one another and which are connected to the base body, wherein the connecting element engages around the at least one floor attachment element between the two flange portions and/or comes into abutment with the base body when the first rail is displaced in a longitudinal direction.

9. The device as claimed in claim 1, wherein the longitudinal adjuster has at least one second rail which is displaceably arranged relative to the first rail, and a spindle drive which is arranged between the first rail and the second rail for displacing the second rail relative to the first rail.

10. The device as claimed in claim 9, wherein the at least one connecting element is arranged below the spindle of the longitudinal adjuster, when viewed in a transverse direction.

11. The device as claimed in claim 1, wherein the device has at least one connecting adapter.

12. The device as claimed in claim 11, wherein the at least one connecting adapter is arranged in the region of the first screw point or the second screw point.

13. The device as claimed in claim 11, wherein the at least one connecting adapter is a spacer profile.

14. A vehicle having a device as claimed in claim 1 for fastening the longitudinal adjuster to the vehicle structure of the vehicle.

* * * * *